(12) United States Patent
Drake

(10) Patent No.: US 10,574,475 B2
(45) Date of Patent: Feb. 25, 2020

(54) HOUSEHOLD APPLIANCE WITH BLUETOOTH CONNECTION AND AUTHENTICATION

(71) Applicant: Haier US Appliance Solutions, Inc., Wilmington, DE (US)

(72) Inventor: Jeff Donald Drake, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 15/987,981

(22) Filed: May 24, 2018

(65) Prior Publication Data
US 2019/0363904 A1 Nov. 28, 2019

(51) Int. Cl.
| G06F 17/00 | (2019.01) |
| H04L 12/28 | (2006.01) |
| G06K 19/06 | (2006.01) |
| H04W 4/80 | (2018.01) |
| H04L 29/06 | (2006.01) |

(52) U.S. Cl.
CPC .... H04L 12/2814 (2013.01); G06K 19/06037 (2013.01); H04L 12/2809 (2013.01); H04L 63/0442 (2013.01); H04W 4/80 (2018.02); *H04L 2012/285* (2013.01)

(58) Field of Classification Search
USPC ........................................................ 235/375
See application file for complete search history.

(56) References Cited

U.S. PATENT DOCUMENTS

| 9,730,071 | B1* | 8/2017 | Guo ...................... H04W 12/08 |
| 9,847,569 | B2 | 12/2017 | Zakaria et al. |
| 2013/0173811 | A1* | 7/2013 | Ha ......................... H04W 76/10 709/227 |
| 2014/0173059 | A1* | 6/2014 | Koningstein ....... H04L 41/0806 709/220 |
| 2014/0362991 | A1* | 12/2014 | Ebrom ................... H04W 12/04 380/270 |
| 2015/0195101 | A1* | 7/2015 | Rashid .................... G08C 17/02 700/90 |
| 2015/0245204 | A1* | 8/2015 | Heydon ................ H04L 43/065 713/171 |
| 2017/0048901 | A1* | 2/2017 | Finch ..................... H04W 12/06 |

FOREIGN PATENT DOCUMENTS

| CN | 102043404 A | 5/2011 |
| CN | 107508735 A | 12/2017 |
| KR | 20110054814 A | 5/2011 |

* cited by examiner

*Primary Examiner* — Tuyen K Vo
(74) *Attorney, Agent, or Firm* — Dority & Manning, P.A.

(57) ABSTRACT

A method of connecting a household appliance to a secure network using a remote interface device includes discovering the appliance by receiving a short-range broadcast from the appliance. The short-range broadcast includes a unique identifier and a model number. The method also includes establishing an encrypted short-range radio connection between the appliance and the remote user interface device. The method further includes receiving a network credential for the secure network and transmitting the network credential to the appliance via the encrypted short-range radio connection. The method then includes connecting the appliance to the secure network using the received network credential.

14 Claims, 9 Drawing Sheets

HOUSEHOLD APPLIANCE WITH BLUETOOTH CONNECTION AND AUTHENTICATION

FIELD OF THE INVENTION

The present subject matter relates generally to household appliances which can connect to a home network and/or a remote network such as the internet via a secure wireless network such as WI-FI. In particular, the present subject matter relates to an improved connection and authentication of the household appliance to the secure wireless network.

BACKGROUND OF THE INVENTION

Household appliances are utilized generally for a variety of tasks by a variety of users. For example, a household may include such appliances as laundry appliances, e.g., a washer and/or dryer, kitchen appliances, e.g., a refrigerator, a microwave, and/or a coffee maker, along with room air conditioners and other various appliances.

Some household appliances can also include features for connecting to and communicating over a secure wireless network. Such communication may provide connected features on the household appliances, e.g., where the household appliance communicates with a personal device, smart home systems, and/or a remote database such as a cloud server.

Typically, such household appliances require multiple processes using multiple user interfaces in order to establish a connection, in particular an initial connection, between the household appliance and a secured WI-FI network.

For example, in some previous attempts to provide a network-enabled household appliance, the appliance has been provided with a WI-FI access point of its own, and in order to commission the appliance on a home WI-FI network, a user would have to connect to the appliance's WI-FI access point separately, e.g., via a separate settings app on a smartphone or tablet, in order to establish an initial connection. Once the initial connection was established, the credentials for the home WI-FI network could be entered into the smartphone and sent to the appliance using another app different from the settings app.

The necessity of interacting with multiple user interfaces, e.g., on different apps, makes commissioning the household appliance on the secured WI-FI network more time consuming and less convenient for some users. As a result, the rate of adoption of connected features on such household appliances may be reduced.

Accordingly, there exists a need for an appliance which can be connected to a secured wireless network in an easier and more convenient manner, such as requiring only a single user interface.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a household appliance is provided. The household appliance includes a cabinet. The cabinet defines a vertical direction, a lateral direction and a transverse direction that are mutually perpendicular. A user interface panel is positioned on an exterior of the cabinet. The household appliance also includes a controller configured to communicate wirelessly with a remote user interface device. The controller is configured to transmit a unique identifier and a model number to the remote user interface device. The controller is also configured to establish an encrypted short-range radio connection with the remote user interface device. A network credential for a secure network is received from the remote user interface device via the encrypted short-range radio connection. The controller is further configured to connect to the secure network using the received network credential.

In accordance with another embodiment of the present disclosure, a method of connecting a household appliance to a secure network using a remote interface device is provided. The method includes discovering the appliance by receiving a short-range broadcast from the appliance. The short-range broadcast includes a unique identifier and a model number. The method also includes establishing an encrypted short-range radio connection between the appliance and the remote user interface device. The method further includes receiving a network credential for the secure network and transmitting the network credential to the appliance via the encrypted short-range radio connection. The method then includes connecting the appliance to the secure network using the received network credential.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
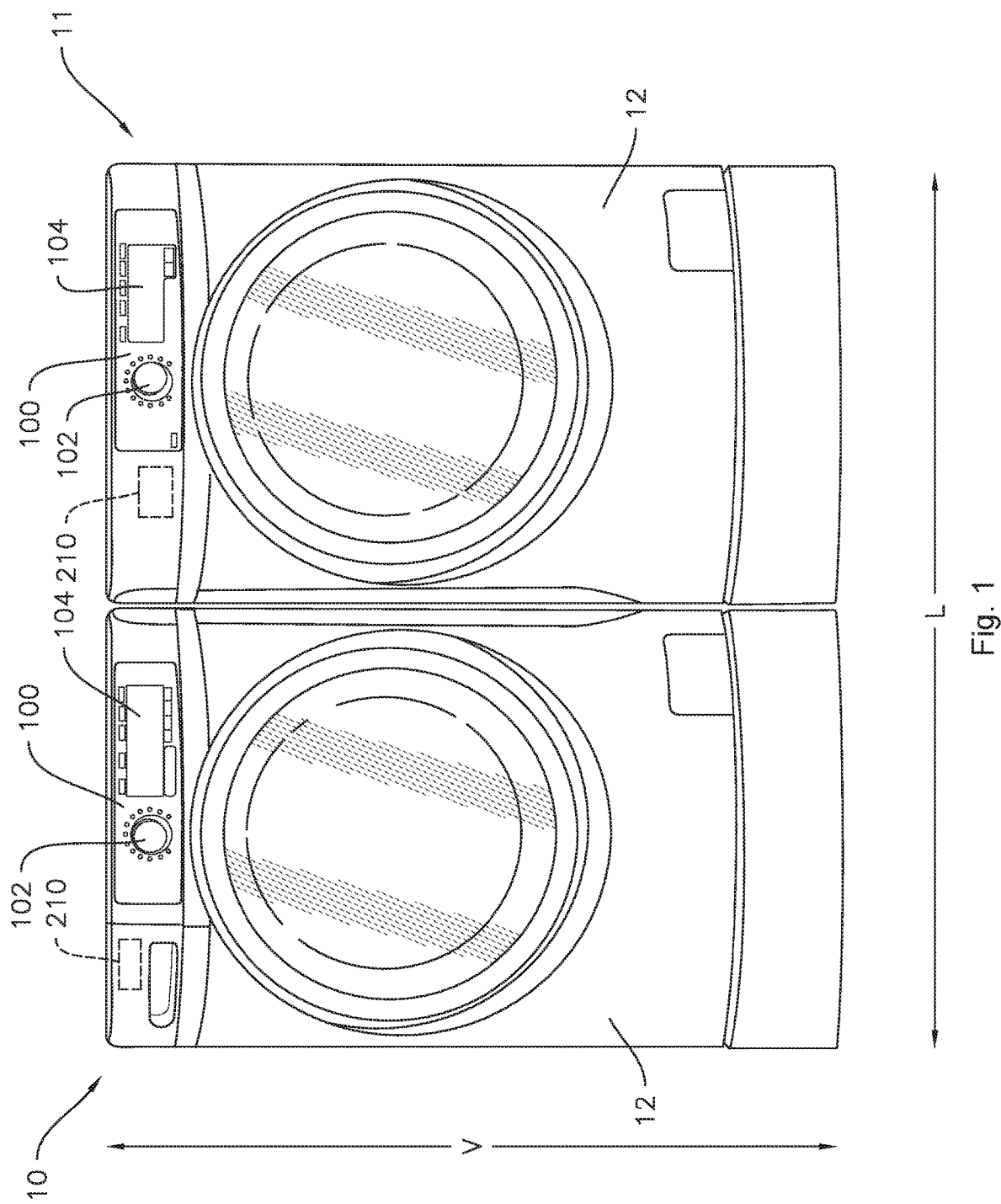
FIG. 1 provides a front view of exemplary laundry appliances in accordance with one or more embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

As may be seen in FIGS. 1 through 6, in accordance with one or more embodiments of the present subject matter, an appliance 10 having a cabinet 12 is provided. The cabinet 12 defines a vertical direction V, a lateral direction L and a transverse direction T that are mutually perpendicular. The cabinet 12 extends between a top portion 13 and a bottom portion 14 along the vertical direction V. Cabinet 12 also extends between a first side portion 15 and a second side portion 16, e.g., along the lateral direction L, and a front portion 17 and a back portion 18, e.g., along the transverse direction T.

A user interface panel 100 and a user input device 102 may be positioned on an exterior of the cabinet 12. The user input device 102 is generally positioned proximate to the user interface panel 100, and in some embodiments, the user input device 102 may be positioned on the user interface panel 100. The appliance 10 may also include features for detecting the presence of a user, as will be described in more detail below.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Generally, the appliance 10 may include a controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliance 10. Operation of the appliance 10 can be regulated by the controller 210 that is operatively coupled to the user interface panel 100. A user interface panel 100 may for example provide selections for user manipulation of the operation of an appliance, e.g., via user input device 102 and/or display 104. In response to user manipulation of the user interface panel 100 and/or user input device 102, the controller 210 may operate various components of the appliance 10. Controller 210 may include a memory and one or more microprocessors, CPUs or the like, such as general or special purpose microprocessors operable to execute programming instructions or micro-control code associated with operation of the appliance 10. The memory may represent random access memory such as DRAM, or read only memory such as ROM or FLASH. In one embodiment, the processor executes programming instructions stored in memory. The memory may be a separate component from the processor or may be included onboard within the processor. Alternatively, a controller 210 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 210 may be programmed to operate the appliance 10 by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions and/or instructions (e.g. performing the methods, steps, calculations and the like and storing relevant data as disclosed herein). It should be noted that controllers 210 as disclosed herein are capable of and may be operable to perform any methods and associated method steps as disclosed herein.

In some embodiments, for example, as illustrated in FIG. 1, the appliance 10 may be one of a set of two or more appliances. In the exemplary embodiment illustrated in FIG. 1, appliance 10 may be one of a pair of laundry appliances, e.g., the appliance may be a washer 10 and/or dryer 11. In embodiments such as illustrated in FIG. 1, the user input device 102 of each appliance 10 and 11 may be positioned on the user interface panel 100. The embodiment illustrated in FIG. 1 also includes a display 104 on the user interface panel.

Figure 2:
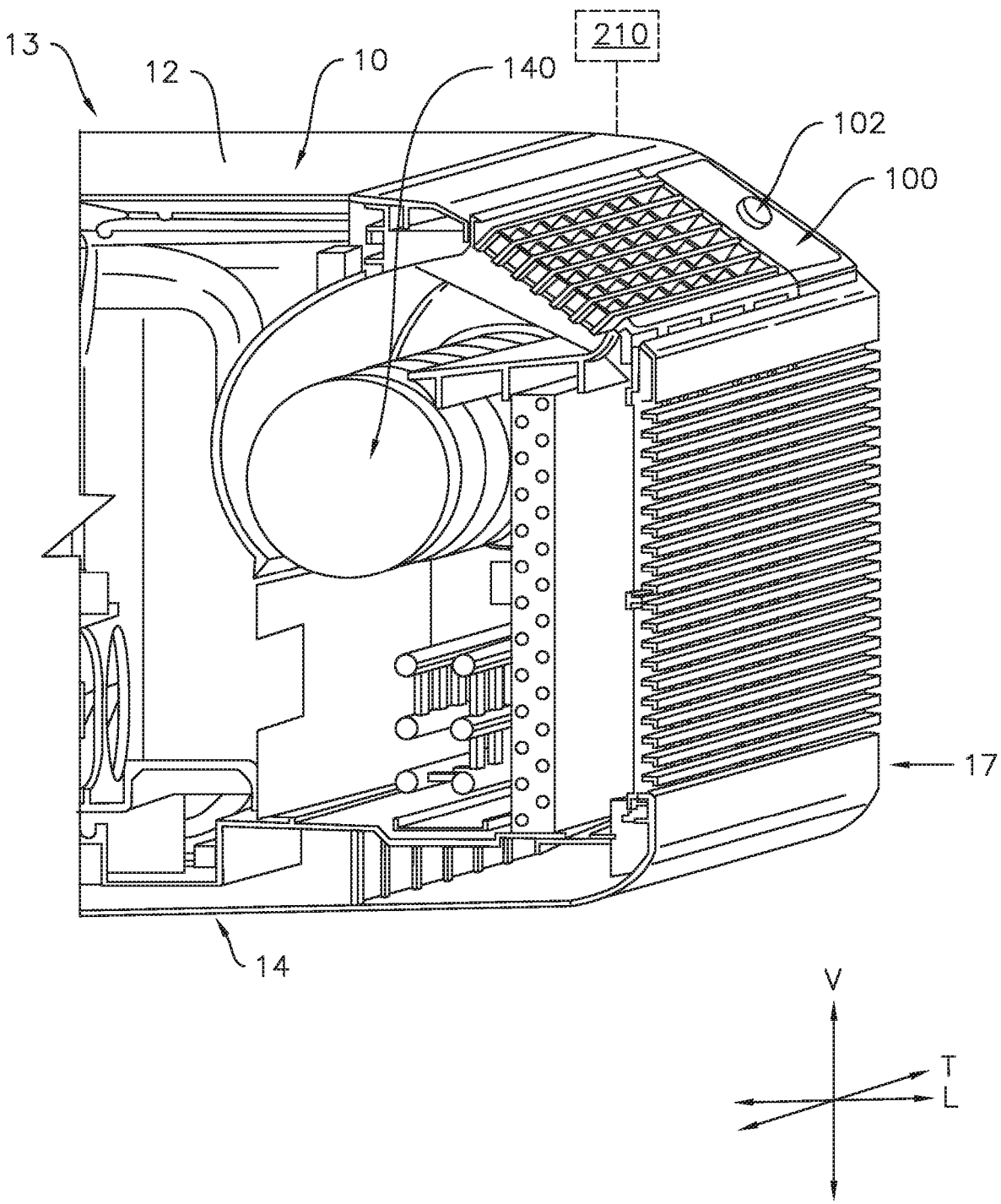
FIG. 2 provides a partial perspective view of an exemplary air conditioner appliance in accordance with additional embodiments of the present disclosure.

FIG. 2 illustrates another example embodiment of the appliance 10, wherein the appliance 10 is a room air conditioner. As illustrated, the exemplary air conditioner 10 includes cabinet 12, user interface panel 100 and user input device 102. In the illustrated example of FIG. 2, the user input device 102 is a control knob, similar to those illustrated in FIGS. 1 and 6. The air conditioner 10 may also include a controller 210, and the controller 210 may be configured to activate the air conditioner 10, e.g., by turning on fan 140 to circulate air.

Figure 3:
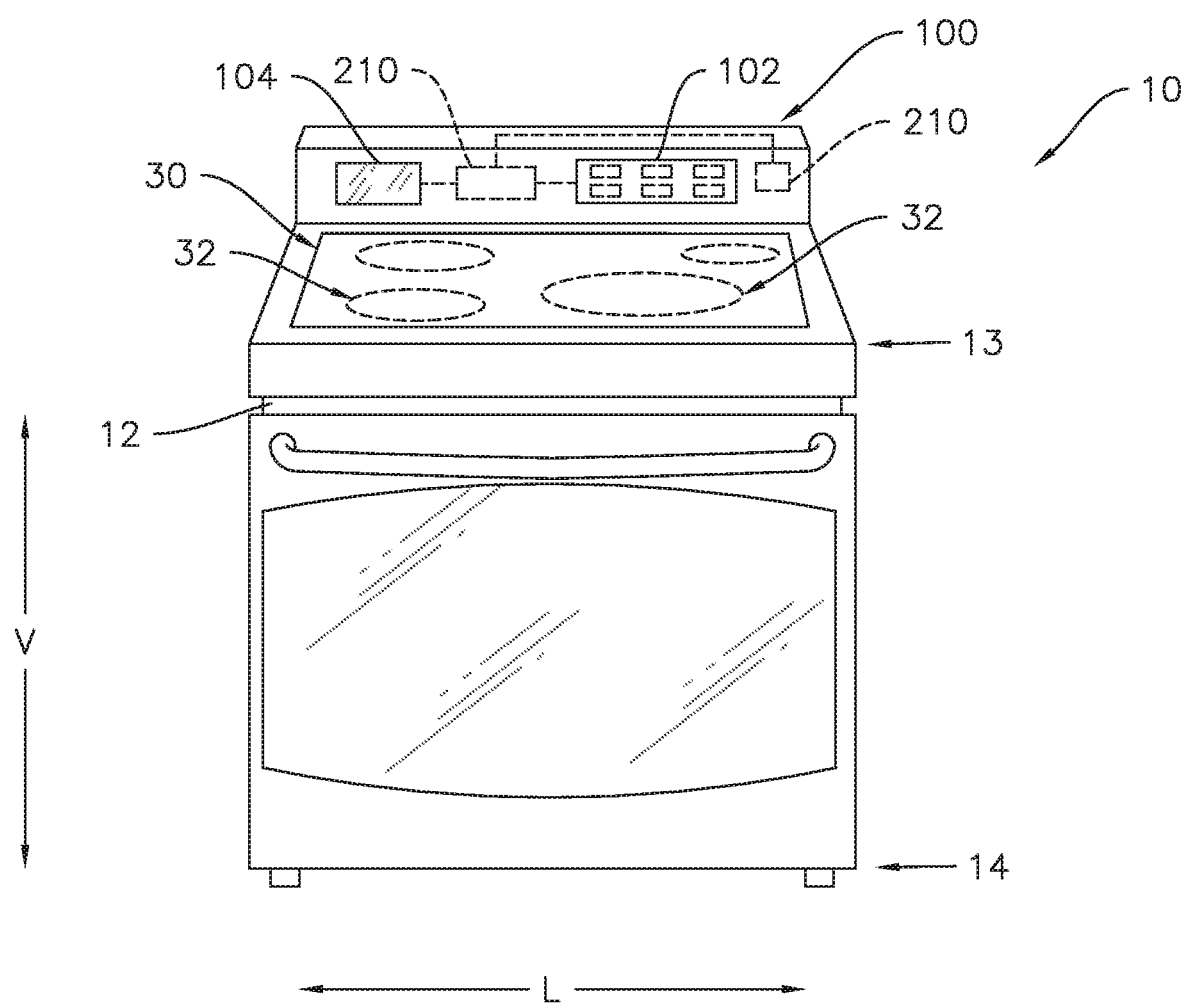
FIG. 3 provides a perspective view of an oven appliance in accordance with additional embodiments of the present disclosure.

FIG. 3 illustrates another example embodiment of the appliance 10, wherein the appliance 10 is an oven appliance including a cooktop and an oven. The exemplary oven appliance 10 illustrated in FIG. 3 includes user interface panel 100 and user input device 102. In the illustrated example of FIG. 3, the user input device 102 is a touch screen interface. Oven appliance 10 is provided by way of example only and is not intended to limit the present subject matter in any aspect. Thus, the present subject matter may be used with other oven appliance configurations, e.g., that define one or more interior cavities for the receipt of food and/or having different heating element arrangements than what is shown in FIG. 3. Further, the present subject matter may be used in a stand-alone cooktop, a hot plate, or any other suitable appliance.

As illustrated in FIG. 3, the exemplary oven appliance 10 generally includes a cooking assembly. The cooking assembly may include one or more heating elements. For example, in some embodiments, the cooking assembly includes cabinet 12 which in some embodiments may be an insulated cabinet 12 with an interior cooking chamber (not shown) configured for the receipt of one or more food items to be cooked defined within insulated cabinet 12. Such cooking chambers are generally understood by those of ordinary skill in the art and are not described in further detail herein. The oven appliance 10 may additionally include a cooktop 30. Cooktop 30 may be disposed on the cabinet 12 generally at or proximate to top portion 13. Cooktop 30 includes one or more heating assemblies 32, e.g., electric heating elements or gas burners, thereon.

Figure 4:
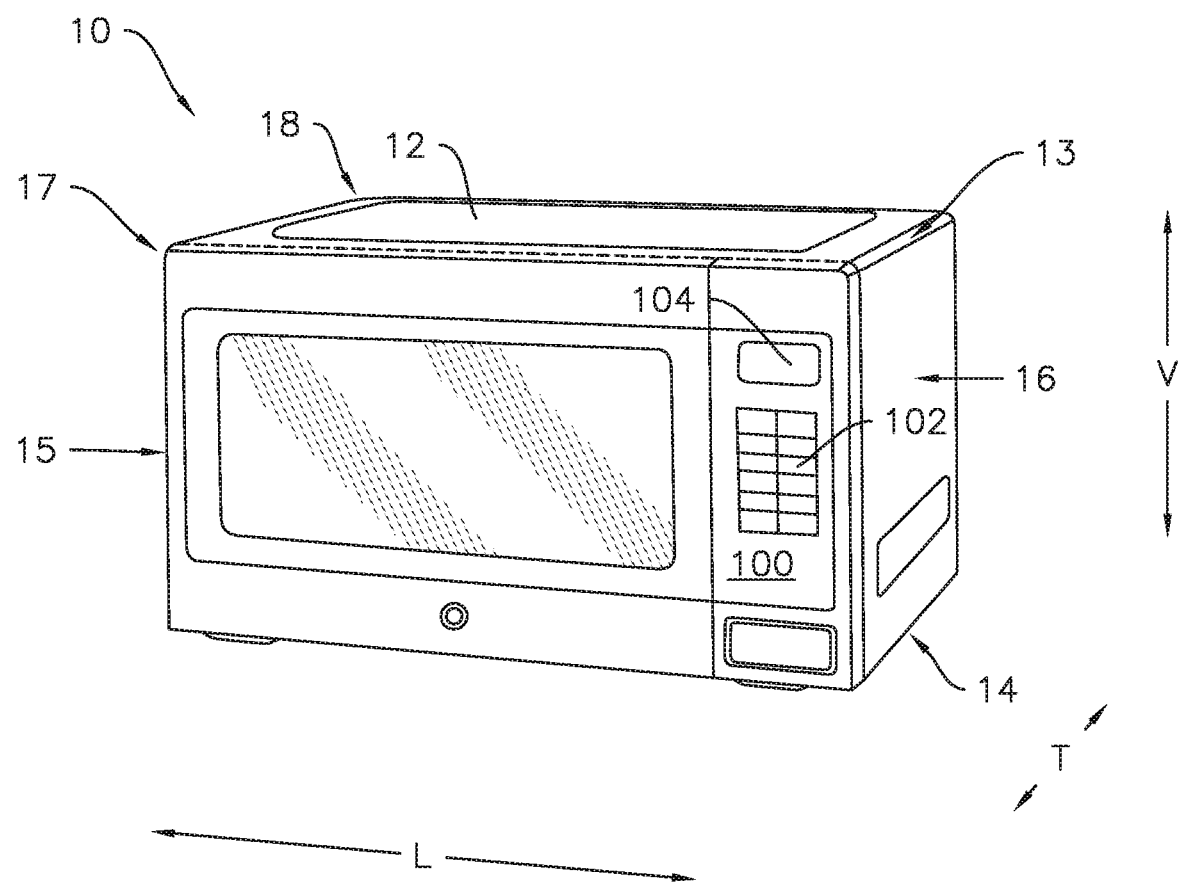
FIG. 4 provides a perspective view of a microwave oven appliance in accordance with additional embodiments of the present disclosure.

In another example embodiment, the appliance 10 may be a microwave oven appliance, such as is illustrated in FIG. 4. It should be understood that microwave oven appliance 10 is provided by way of example only. Thus, the present subject matter is not limited to microwave oven appliance 10 and may be utilized in any suitable appliance.

Microwave oven appliance 10 includes a cabinet 12. A cooking chamber is defined within the cabinet 12 of the microwave 10. Microwave 10 of FIG. 4 is configured to heat articles, e.g., food or beverages, within the cooking chamber using electromagnetic radiation. Microwave appliance 10 may include various components which operate to produce the electromagnetic radiation, as is generally understood. For example, microwave appliance 10 may include a magnetron (such as, for example, a cavity magnetron), a high voltage transformer, a high voltage capacitor and a high voltage diode. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to the cooking chamber. The structure and intended function of microwave ovens are generally understood by those of ordinary skill in the art and are not described in further detail herein.

Figure 5:
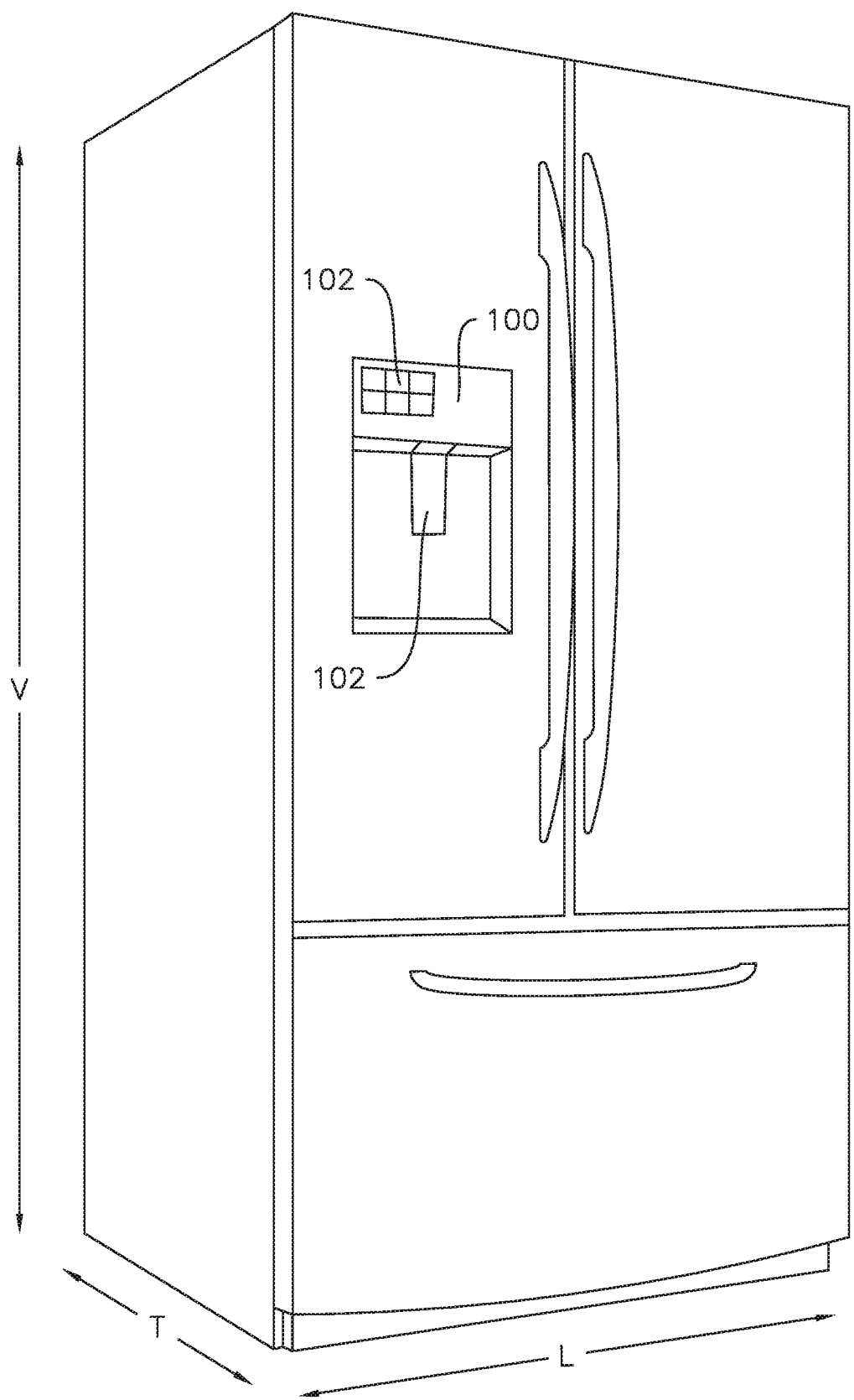
FIG. 5 provides a perspective view of a refrigeration appliance in accordance with additional embodiments of the present disclosure.

In another embodiment, the appliance 10 may be a refrigerator appliance, such as is illustrated in FIG. 5. FIG. 5 provides a perspective view of a refrigerator appliance 10 according to an exemplary embodiment of the present subject matter. Refrigerator appliance 10 includes a cabinet 12. The example refrigerator appliance 10 depicted in FIG. 5 is generally referred to as a bottom mount refrigerator appliance. However, it should be understood that refrigerator appliance 10 is provided by way of example only. Thus, the present subject matter is not limited to refrigerator appliance 10 and may be utilized in any suitable appliance, including without limitation, side-by-side style refrigerator appliances or top mount refrigerator appliances as well.

Refrigerator appliance 10 may also include a dispensing assembly for dispensing, e.g., liquid water and/or ice to, for example, a dispenser recess defined on the exterior of cabinet 12, as is generally understood in the art. Thus, in some embodiments, the appliance 10 may be a refrigerator appliance and the user interface panel 100 may be or include a control panel of the dispensing assembly. Further with reference to the exemplary embodiment illustrated in FIG. 5, in some exemplary embodiments including refrigerator appliance 10 and a dispensing assembly, the user input device 102 may be a paddle of the dispensing assembly, the paddle 102 in FIG. 5 being an exemplary embodiment of the user input device. Such dispensing assemblies, including actuators therefor such as paddles, levers, etc., are generally understood in the art and are not described further herein.

Figure 6:
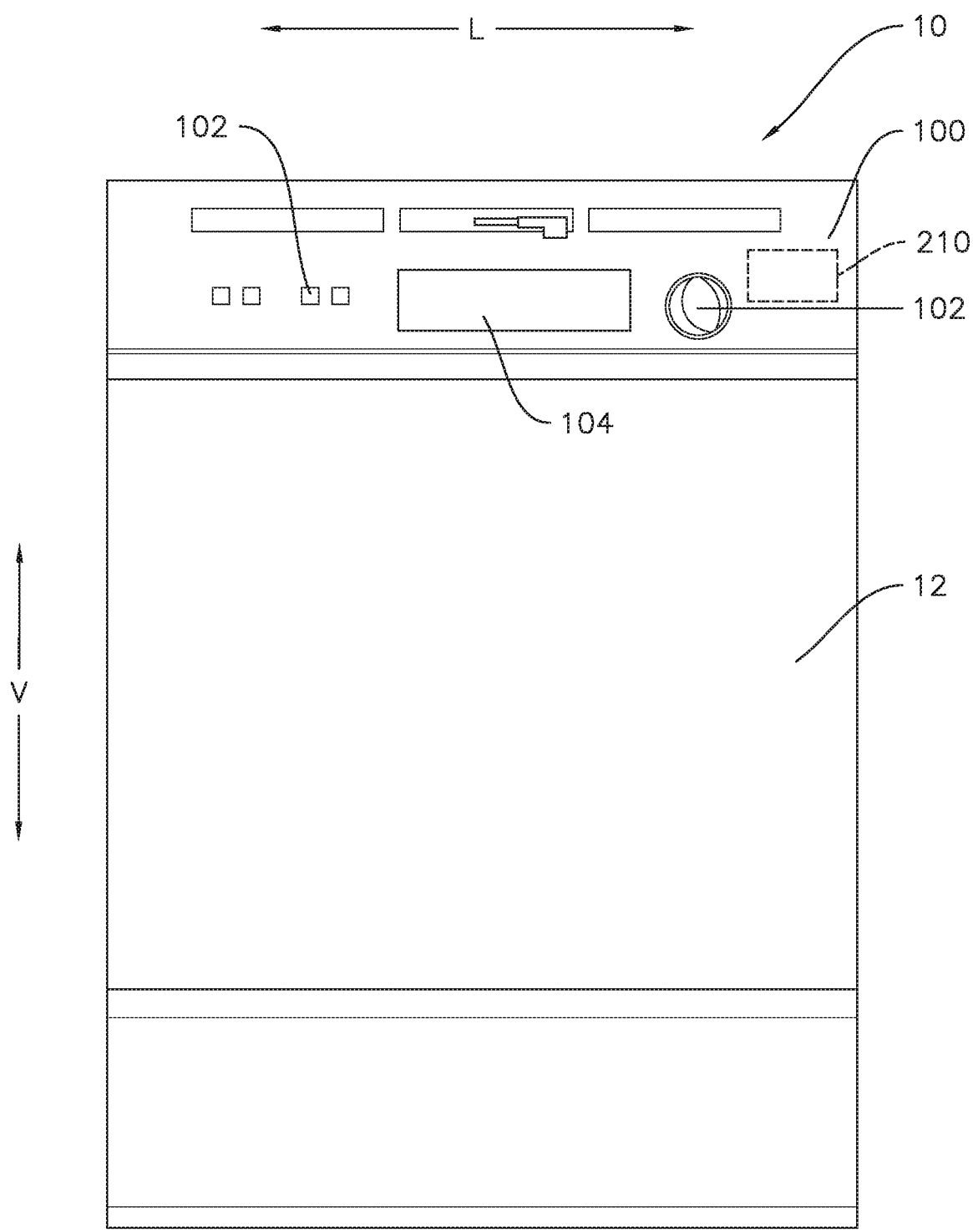
FIG. 6 provides a front view of a dishwashing appliance in accordance with additional embodiments of the present disclosure.

FIG. 6 provides a front view of a dishwashing appliance 10 according to yet another exemplary embodiment of the present subject matter. The dishwashing appliance includes a cabinet 12 with a user interface panel 100 thereon. In the illustrated example embodiment of the FIG. 6, the user interface panel includes multiple user input devices 102, e.g., a knob and a plurality of buttons, as well as a display 104. In various embodiments, any suitable combination of any one or more of the illustrated user input devices 102 and display 104 may be provided.

According to various embodiments of the present disclosure, the appliance 10 may take the form of any of the examples described above, or may be any other household appliance where improved ease of connecting to a secure wireless network is desired. Thus, it will be understood that the present subject matter is not limited to any particular household appliance.

Figure 7:
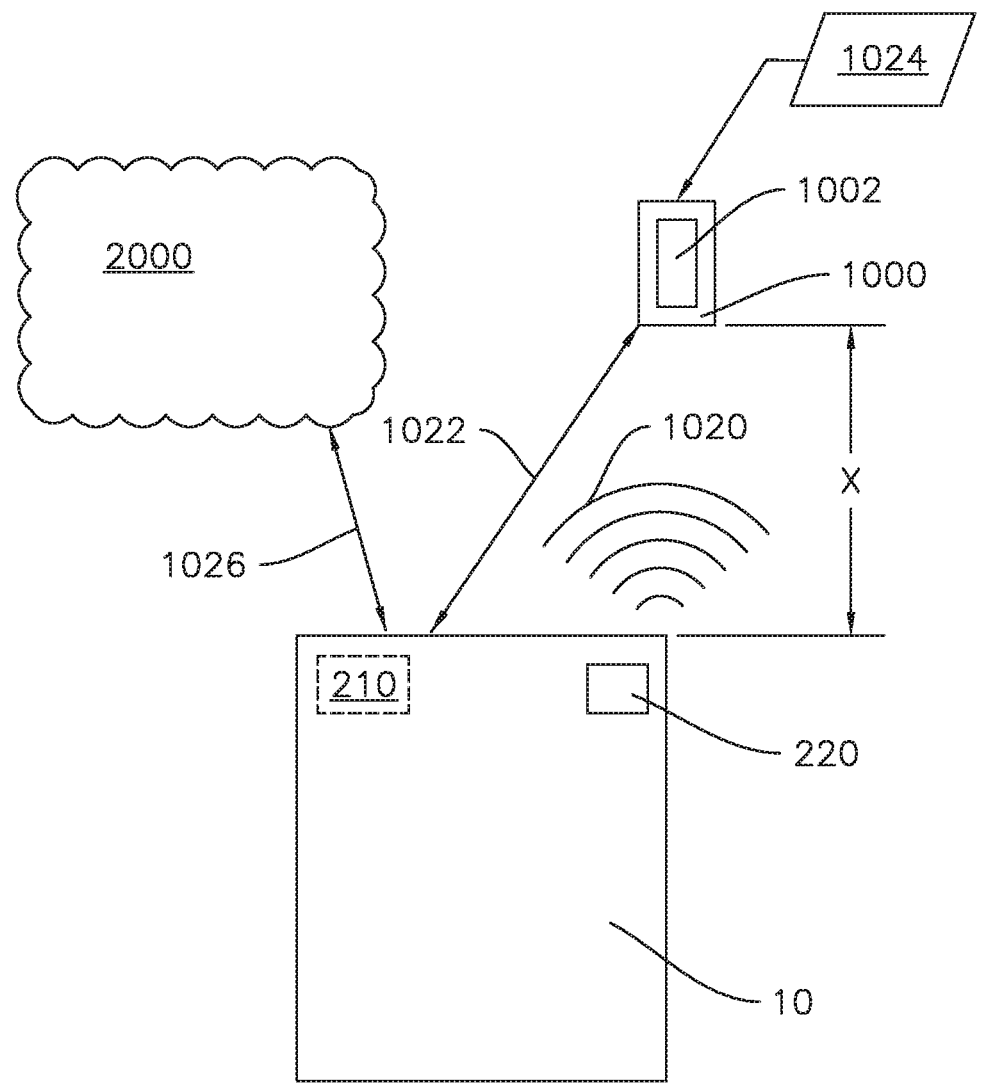
FIG. 7 provides a schematic diagram of a household appliance in communication with a remote user interface device according to one or more embodiments of the present disclosure.

Turning now to FIG. 7, the appliance 10, and in particular, controller 210 thereof, may be configured to communicate with a separate device external to the appliance, such as a communications device or other remote user interface device 1000. The remote user interface device 1000 may be a laptop computer, smartphone, tablet, personal computer, wearable device, smart home system, and/or various other suitable devices including a user interface such as a touchscreen display 1002. The appliance 10 may be in communication with the remote user interface device 1000 through various possible communication connections and interfaces.

The remote user interface device 1000 may include a memory for storing and retrieving programming instructions. Thus, the remote user interface device 1000 may provide a remote user interface which may be an additional user interface to the user interface panel 100. For example, the remote user interface device 1000 may be a smartphone operable to store and run applications, also known as "apps," and the remote user interface may be provided as a smartphone app.

The appliance 10 and the remote user interface device 1000 may be matched in wireless communication, e.g., connected to the same wireless network. The appliance 10 may communicate with the remote user interface device 1000 via short-range radio such as BLUETOOTH® or any other suitable wireless network having a layer protocol architecture. As used herein, "short-range" may include ranges of about ten meters or less, up to about one hundred meters. For example, the wireless network may be adapted for short-wavelength ultra-high frequency (UHF) communications in a band between 2.4 GHz and 2.485 GHz (e.g., according to the IEEE 802.15.1 standard). In particular, BLUETOOTH® Low Energy, e.g., BLUETOOTH® Version 4.0 or higher, may advantageously provide short-range wireless communication between the appliance 10 and the remote user interface device 1000. For example, BLUETOOTH® Low Energy may advantageously minimize the power consumed by the exemplary methods and devices described herein due to the low power networking protocol of BLUETOOTH® Low Energy. As another example, BLUETOOTH® Low Energy may advantageously provide improved accuracy in determining a distance X between the remote user interface device 1000 and the appliance 10. For instance, BLUETOOTH® Low Energy is more accurate than GPS and may provide fine grained location (e.g., accurate within inches) and distance from an appliance 10 and/or a particular appliance 10 of interest out of multiple appliances 10, e.g., in a kitchen, based on a received signal strength indicator.

Methods and systems according to the present disclosure advantageously provide a smoother and more convenient user experience when commissioning one or more appliances 10. For example, commissioning the appliance or appliances may include connecting the appliance(s) to a WI-FI network for the first time, which, in at least some embodiments of the present subject matter, may be accomplished with a remote user interface device 1000, e.g., a smartphone or tablet, within a single app and without having to leave the single app to access, e.g., WI-FI settings of the remote user interface device 1000. For example, as described in more detail below, the present disclosure includes connecting to and communicating with an appliance 10 via BLUETOOTH® in order to discover the appliance 10 which is not connected to WI-FI, authenticate the appliance 10, provide WI-FI credentials to the appliance 10, and ultimately connect the appliance 10 to a WI-FI network.

An initial phase or process may include discovering the appliance 10. In various embodiments, the controller 210 may be configured to advertise or broadcast a signal 1020, such as a BLUETOOTH® Low Energy ("BLE") signal. The remote user interface device 1000 may scan for BLE advertisements, e.g., automatically, including when an appliance app on the remote user interface device 1000 is active or simply running in the background. For example, the remote user interface device 1000 may provide a notification when an appliance 10 is discovered.

The controller 210 may be configured to advertise over BLE when it is initially activated and prior to connecting the appliance 10 to WI-FI. Thus, in some embodiments, the controller 210 may further be configured to discontinue the advertising or broadcast 1020 once the appliance 10 is connected to WI-FI network 2000. Accordingly, the remote user interface device 1000 may be operable to discover or identify appliances 10 which are capable of a WI-FI connection but have yet to be authenticated and connected to a WI-FI network. The remote user interface device 1000 may also generate a list of identified appliances 10 to be connected to the WI-FI network 2000.

The broadcast 1020 may include a universally unique identifier (UUID), an appliance type, and a model number. The remote user interface device 1000 may be configured to filter out any signals, e.g., BLUETOOTH® signals, which do not include the UUID when scanning for broadcasts. The UUID may be specific to the network or service to which the appliance 10 will ultimately connect, e.g., the UUID may be specific to the manufacturer of the appliance 10.

In some embodiments, the remote user interface device 1000 may also be configured to display a picture of the appliance 10 on the user interface 1002 of the remote user interface device 1000 based on the received model number. The remote user interface device 1000 may then prompt a user to indicate whether the user wishes to connect the indicated appliance 10, e.g., as shown in the picture, to a WI-FI network.

Once the appliance 10 has been discovered, the appliance 10 may be authenticated and connected to a secure wireless, e.g., WI-FI, network 2000. In order to authenticate the appliance 10 and connect it to the secure WI-FI network 2000, the appliance 10 and the remote user interface device 1000 may establish an encrypted short-range radio connection 1022 therebetween, such as a BLE connection on an encrypted channel.

Prior to establishing the encrypted short-range radio connection 1022, the appliance 10 may authenticate the remote user device 1000. For example, the appliance 10 may include a memory which may be part of or operatively connected to the controller 210. The memory may include a public key associated with a cloud server, such as a cloud server associated with the appliance manufacturer, stored therein. The remote user interface device 1000 may transmit a communication packet signed with a private key associated with the cloud server to the appliance 10. The appliance 10 may thereby authenticate the remote user device 1000 by verifying the signature, e.g., decrypting the communication packet, with the public key before establishing the encrypted short-range radio connection.

Once this encrypted connection has been established, the appliance 10 can be authenticated and then receive a network credential 1024 for the secure network 2000, e.g., the secured WI-FI network, from the remote user interface device 1000 over the encrypted channel 1022. For example, the remote user interface device 1000 may receive the network credential 1024 for the secure network 2000 from a user and then transmit the network credential 1024 to the appliance 10 via the encrypted short-range radio connection 1022. The appliance 10 may then use the received network credential 1024 to establish a connection 1026 to the secure network 2000.

As mentioned above, the remote user interface device 1000 may be configured to run software programs or applications. The steps of discovering the appliance 10, establishing the encrypted short-range radio connection 1022, receiving the network credential 1024, and transmitting the network credential 1024 to the appliance 10 may all be performed within a single application on the remote user interface device 1000. For example, the requirement to connect the remote user interface device 1000 to the appliance 10 using WI-FI which is only accessible through a separate app, e.g., a settings app, on the remote user interface device 1000 may be eliminated.

In some embodiments, the appliance 10 may be authenticated based on distance. Distance-based authentication may include determining that the appliance 10 and the remote user interface device 1000 are proximate to one another, e.g., determining that a distance X between the appliance 10 and the remote user interface device 1000 is within, e.g., equal to or less than, a distance threshold, before establishing the encrypted short-range radio connection 1022. For example, the distance X may be determined using a received signal strength indicator, as described above.

In some embodiments, the appliance 10 may be authenticated using a public and private key of the appliance 10 as well as or instead of based on distance. For example, the private key of the appliance 10 may be stored in the memory of the appliance 10 and the broadcast 1020 in the step of discovering the appliance 10 may be signed with the private key of the appliance. The public key of the appliance 10 may be displayed or provided on an exterior of the appliance 10, such as an exterior of the cabinet 12. The public key may be encoded in a barcode 220, such as a one-dimensional barcode or a two-dimensional barcode or quick response "QR" code. The remote user interface device 1000 may scan the barcode 220, e.g., within the same single app mentioned above, in order to receive the public key by decoding the barcode 220. In such embodiments, the remote user interface device 1000 may then authenticate the appliance 10 by decrypting the broadcast 1020 using the public key of the appliance 10.

Figure 8:
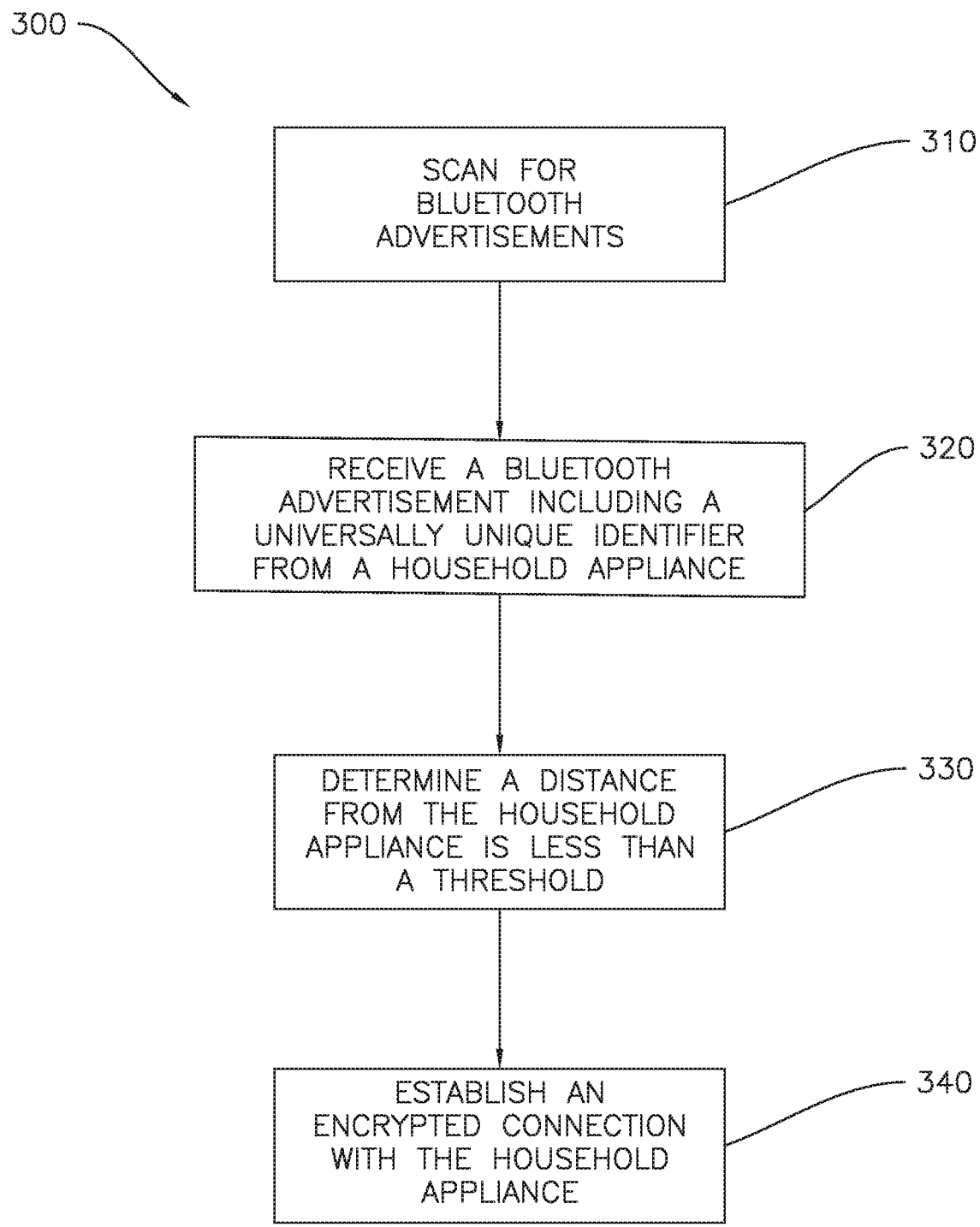
FIG. 8 provides a flowchart illustrating an example method of discovering a household appliance and creating a secure connection thereto according to one or more embodiments of the present disclosure.

Exemplary methods according to the present subject matter include the method 300 illustrated in FIG. 8. FIG. 8 provides example steps of discovering the appliance 10, which may form a part of or a preliminary step for the method 400 of connecting a household appliance to a secure network using a remote interface device illustrated in FIG. 9 and described below. As shown in FIG. 8, the method 300 may include a step 310 of scanning for advertisements, such as BLUETOOTH® Low Energy advertisements, which step may be performed, e.g., by a remote user interface device 1000 as described above. As shown at step 320 in FIG. 8, the method 300 may include receiving an advertisement from a household appliance (such as any one or more of the exemplary household appliances illustrated in FIGS. 1 through 6) and the advertisement may include a specific universally unique identifier, e.g., associated with the appliance manufacturer as described above. In a subsequent step, e.g., as shown at 330 in FIG. 8, the method 300 may include determining that a distance between the appliance and a remote user interface device is less than a distance threshold. If the distance is less than the threshold, the method 300 may then establish an encrypted connection with the household appliance at step 340, e.g., between the household appliance and a remote user interface device.

Figure 9:
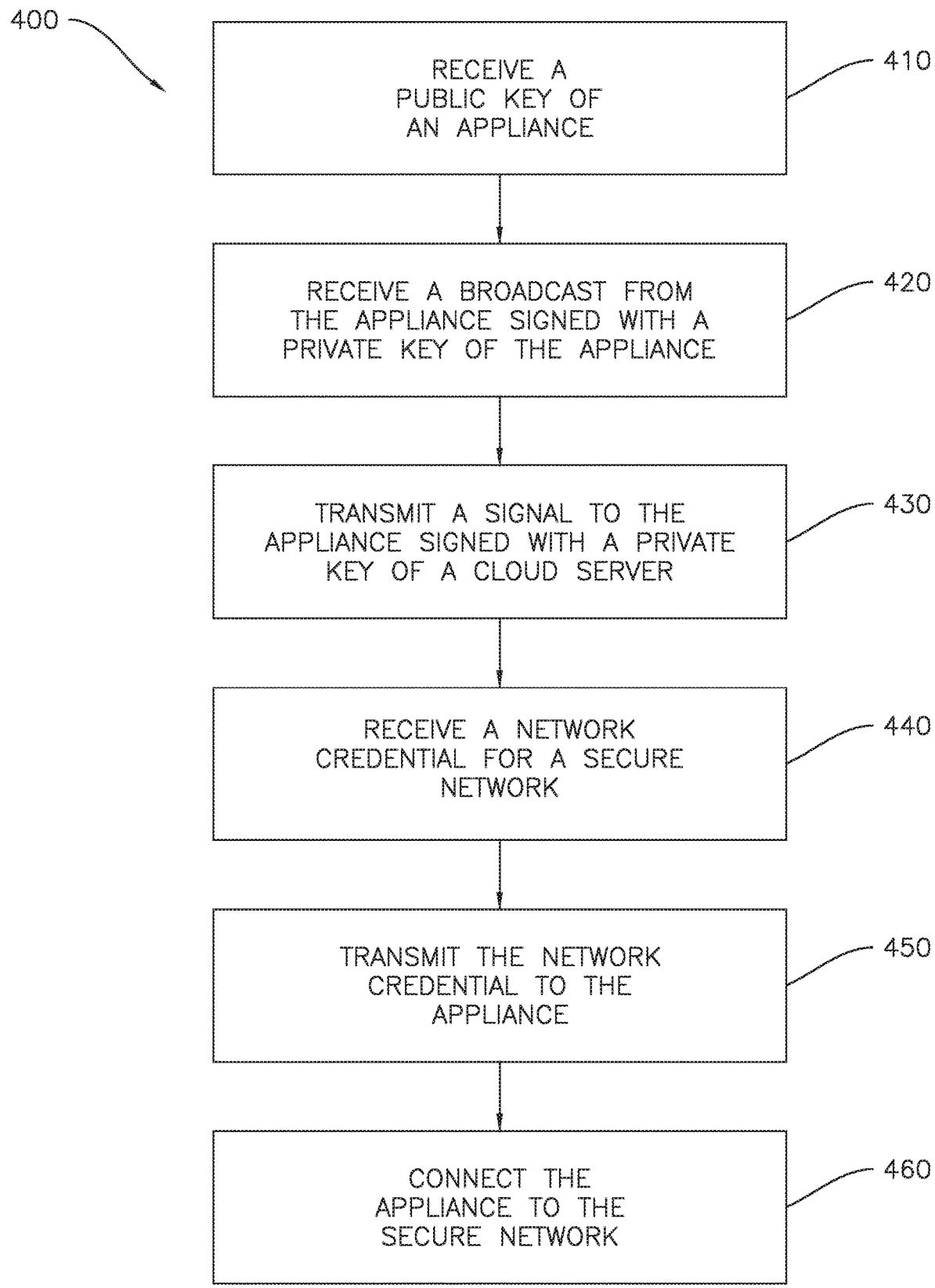
FIG. 9 provides a flowchart illustrating an example method of connecting a household appliance to a secure network using a remote interface device according to one or more embodiments of the present disclosure.

FIG. 9 provides a flowchart of an exemplary method 400 of connecting a household appliance to a secure network using a remote interface device. For example, in some embodiments, the steps of the method 400 described below may be performed over an encrypted connection which was established according to the method 300 illustrated in FIG. 8. Method 400 includes a step 410 of receiving a public key of the appliance. For example, the public key of the appliance may be received by scanning a barcode on the appliance. The method 400 may also include a step 420 of receiving a broadcast, e.g., a BLUETOOTH® advertisement, from the appliance which is signed with a private key of the appliance. When the received broadcast is decrypted with the public key of the appliance, the signature is verified and the method 400 may then include a step 430 of transmitting a signal to the appliance which is encrypted with a private key of a cloud server, e.g., the private key may be associated with a cloud server operated by or otherwise associated with a manufacturer of the appliance. The appliance may then verify the transmission by decrypting the transmission with a public key associated with the cloud server. For example, the public key associated with the cloud server may be programmed into or stored in a memory of the appliance. Method 400 may also include a step 440 of receiving a network credential for a secure network and a step 450 of transmitting the network credential to the appliance, e.g., over an encrypted connection such as may be established according to the method 300 of FIG. 8. The appliance may then connect to the secure network, e.g., as shown at step 460 in FIG. 9.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A household appliance comprising:
    a cabinet defining a vertical direction, a lateral direction and a transverse direction that are mutually perpendicular;
    a public key of the appliance displayed on the exterior of the cabinet;
    a user interface panel positioned on an exterior of the cabinet;
    a controller configured to communicate wirelessly with a remote user interface device; and
    a memory in operative communication with the controller;
    wherein the memory is configured to store a public key associated with a cloud server and a private key of the appliance, wherein the controller is further configured to:
        transmit a unique identifier and a model number in an encrypted transmission that is signed with the private key of the appliance to the remote user interface device;
        receive from the remote user interface device a communication packet signed with a private key associated with the cloud server;
        authenticate the remote user interface device by decrypting the communication packet with the public key associated with the cloud server;
        establish an encrypted short-range radio connection with the remote user interface device after authenticating the remote user interface device;
        receive a network credential for a secure network from the remote user interface device via the encrypted short-range radio connection; and
        connect to the secure network using the received network credential.

2. The appliance of claim 1, wherein the controller is further configured to determine a distance between the remote user interface device and the appliance is less than a distance threshold before establishing the encrypted short-range radio connection.

3. The appliance of claim 1, wherein the public key is encoded in a two-dimensional barcode.

4. The appliance of claim 1, wherein the encrypted short-range radio connection uses low-energy ultra-high-frequency communications.

5. The appliance of claim 1, wherein the controller is configured to transmit the unique identifier and the model number via a low-energy ultra-high-frequency radio signal.

6. The appliance of claim 1, wherein the controller is further configured to discontinue transmitting the unique identifier and the model number after connecting to the secure network.

7. A method of connecting a household appliance to a secure network using a remote user interface device, the method comprising:
    discovering the appliance by receiving an encrypted short-range broadcast from the appliance to the remote user interface device, the short-range broadcast encrypted with a private key of the appliance and comprising a unique identifier and a model number;
    receiving a public key of the appliance with the remote user interface device;
    authenticating the appliance by the remote user interface device decrypting the encrypted short-range broadcast using the public key of the appliance;

transmitting a communication packet signed with a private key associated with a cloud server from the remote user interface device to the appliance;

authenticating the remote user interface device by the appliance receiving the communication packet and decrypting the communication packet using a public key associated with the cloud server, the public key associated with the cloud server stored in a memory of the appliance;

establishing an encrypted short-range radio connection between the appliance and the remote user interface device after authenticating the appliance and after authenticating the remote interface device;

receiving a network credential for the secure network with the remote user interface device;

transmitting the network credential to the appliance from the remote user interface device via the encrypted short-range radio connection; and connecting the appliance to the secure network using the received network credential.

8. The method of claim 7, wherein the steps of discovering the appliance, establishing the encrypted short-range radio connection, receiving the network credential and transmitting the network credential to the appliance are all performed within a single application on the remote user interface device.

9. The method of claim 7, further comprising displaying a picture of the appliance on a user interface of the remote user interface device before receiving the network credential, the picture based on the received model number.

10. The method of claim 7, further comprising determining that a distance between the remote user interface device and the appliance is less than a distance threshold before establishing the encrypted short-range radio connection.

11. The method of claim 7, wherein the step of receiving the public key of the appliance with the remote user interface device comprises scanning the public key on an exterior of the appliance with the remote user interface device.

12. The method of claim 11, wherein the public key is encoded in a two-dimensional barcode on the exterior of the appliance, and wherein scanning the public key with the remote user interface device comprises scanning and decoding the two-dimensional barcode.

13. The method of claim 7, wherein the short-range broadcast comprising the unique identifier and the model number is a low-energy ultra-high-frequency radio signal.

14. The method of claim 7, wherein the encrypted short-range radio connection uses low-energy ultra-high-frequency communications.

* * * * *